United States Patent [19]
Prescaro et al.

[11] Patent Number: 5,242,192
[45] Date of Patent: Sep. 7, 1993

[54] FABRIC COVER/CHUTE FOR AIRBAG MODULES

[75] Inventors: Kay H. Prescaro, Ogden; Thomas M. Kriska, Kaysville, both of Utah

[73] Assignee: Morton International, Inc., Chicago, Ill.

[21] Appl. No.: 840,243

[22] Filed: Feb. 24, 1992

[51] Int. Cl.⁵ ............................................. B60R 21/22
[52] U.S. Cl. ................................. 280/730; 280/732
[58] Field of Search ................. 280/730, 732, 742; 193/25 R, 2 R, 34

[56] References Cited

U.S. PATENT DOCUMENTS

| | | | |
|---|---|---|---|
| 876,529 | 1/1908 | Dorman | 193/24 R X |
| 3,163,280 | 12/1964 | Haugland | 193/25 R |
| 4,778,031 | 10/1988 | Curiel | 193/25 R X |
| 4,903,986 | 2/1990 | Cok et al. | 280/743 |
| 4,921,735 | 5/1990 | Bloch | 280/728 X |
| 5,013,064 | 5/1991 | Miller et al. | 280/730 |
| 5,020,651 | 6/1991 | Lockett | 193/25 R |
| 5,064,217 | 11/1991 | Shiraki | 280/743 |
| 5,135,253 | 8/1992 | Hirashima et al. | 280/732 |

FOREIGN PATENT DOCUMENTS

| | | | |
|---|---|---|---|
| 3837085 | 5/1990 | Fed. Rep. of Germany | 280/743 |
| 303950 | 12/1990 | Japan | 280/743 |

Primary Examiner—David M. Mitchell
Assistant Examiner—Gary C. Hoge
Attorney, Agent, or Firm—Mark LaMarre; Gerald White

[57] ABSTRACT

A chute guide device for directing the deployment of a passenger side air bag along a predetermined path to the inside of a rupturable instrument panel. The chute resists deployment of the air bag behind the instrument panel. Also, the chute shields the air bag module from foreign objects which may otherwise fall into the module.

16 Claims, 12 Drawing Sheets

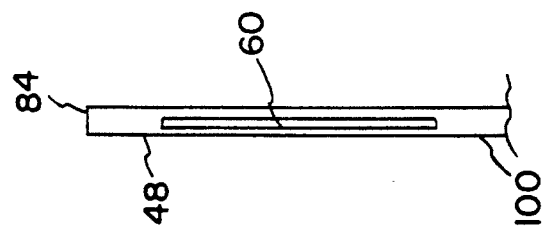
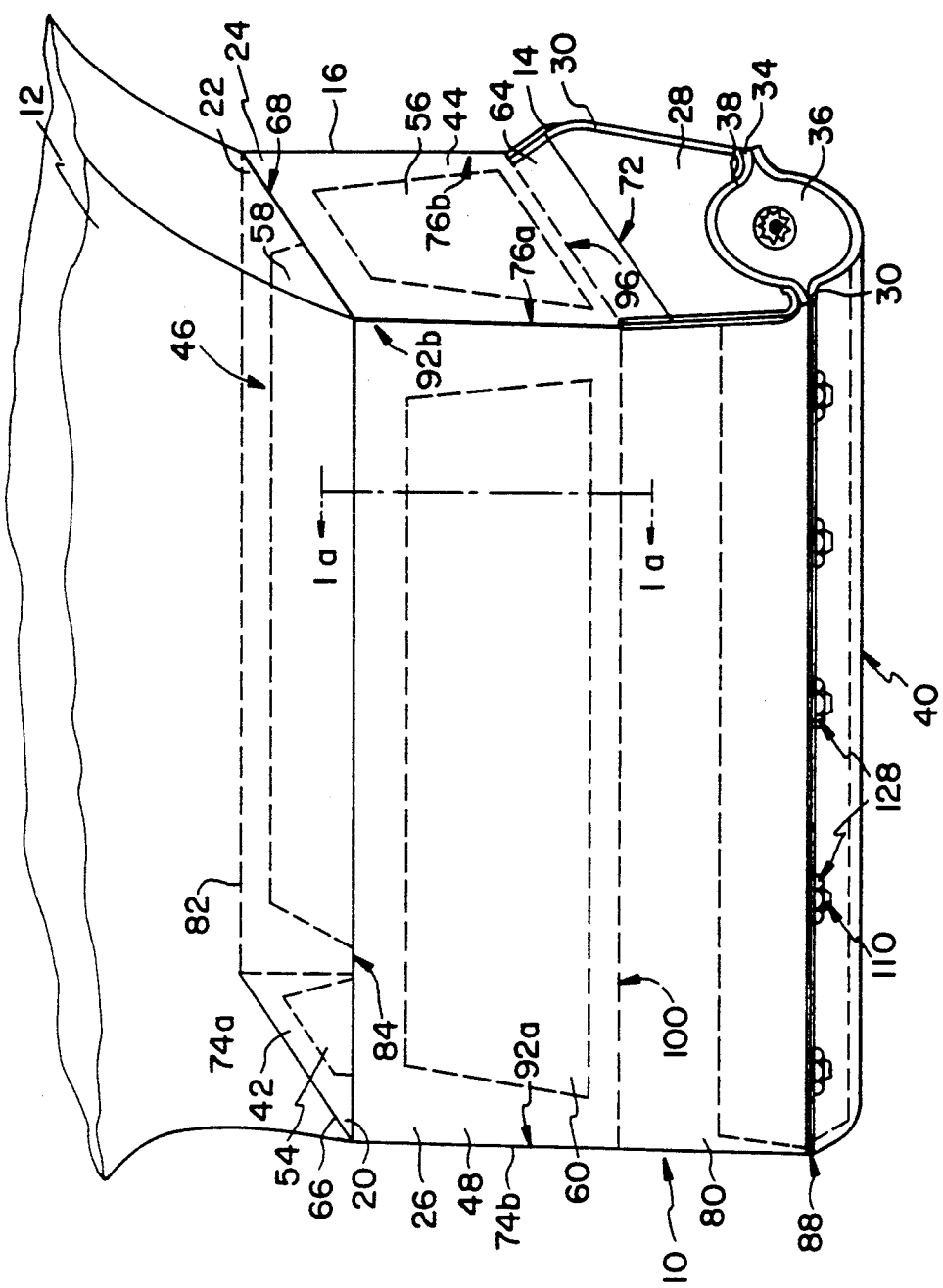

FABRIC COVER/CHUTE FOR AIRBAG MODULES

BACKGROUND OF THE INVENTION

1. Field of the Invention

This invention relates generally to inflatable type modular occupant restraint systems for passenger vehicles or, as it is more commonly known, an air bag restraint system. Such a system may be installed in an automobile or other vehicle, at least in part on the steering wheel for the protection of the driver and also in the dashboard or passenger side instrument panel for passenger protection in the event of a collision. More particularly, this invention relates to an improvement in the means for guiding and directing the initial deployment of the cushion along a predetermined path.

2. Description of Prior Art

An air bag restraint system typically includes a canister, which has an open side and encloses an inflator and at least part of an air bag, and a cover which conceals the module from view. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard. Alternatively, due to structural and cosmetic considerations, a passenger side air bag may be mounted such that the edge of the container opening may be a couple of inches behind the dashboard.

When the vehicle is involved in a collision, a crash signal initiates operation of the inflator to cause the air bag to deploy. The inflator produces an inert gas (e.g., nitrogen) which is directed under pressure into the air bag to force the air bag out of the container incorporated in the module and into the passenger compartment of the vehicle. As the air bag is forced out of the container, the pressure exerted on the dashboard causes selected portions of the dashboard to separate, in a predetermined manner along tear seams or break away seams (hereinafter referred to as "tear seams") to enable the air bag to be directed into the passenger compartment. As the air bag is directed into the passenger compartment, it is inflated by the continued flow of gas produced by the inflator. Care should be taken so that the air bag is not torn or punctured during deployment by sharp edges of the ruptured seams of the dashboard or on structural supports behind the dashboard.

During deployment of a passenger side air bag mounted some distance behind the instrument panel or dashboard the air bag expands until sufficient pressure develops to break the tear seams of the dashboard. Should sufficient pressure fail to develop or should the air bag find a path of lesser resistance the air bag may not deploy properly. Should the air bag find a path of lesser resistance behind the dashboard the bag may continue to expand in the direction of lesser resistance inflating completely behind the dashboard thus making the air bag unavailable to protect the vehicle occupant. Alternatively, the air bag may continue to inflate until another opening is found, for example at the bottom of the dashboard thereby allowing the air bag to expand down to the floor of the passenger compartment. This mode of deployment would provide inadequate protection for the vehicle occupant's torso and upper body. Also, the air bag may continue to inflate and expand behind the dashboard extruding itself behind the dashboard until the dashboard fails at other than predetermined failure points. At this time the bag can expand toward the occupant transporting the dashboard into the occupant thereby causing injury to the occupant. Such improper deployment of the passenger side air bag would render the air bag unusable for the protection of the occupant and may result in further injury to the occupant.

Also, of concern is that during manufacture, shipping, and storage, extraneous material such as small pieces of metal, nuts, bolts, fasteners or the like may fall into the canister. Storage herein is taken to mean storage of the module in a warehouse or the like prior to installation in a vehicle and storage behind the dashboard of a vehicle prior to deployment in the event of a collision with another object. The release of this extraneous material during deployment of the air bag may result in injury to the vehicle occupants.

Solutions have been suggested to guide the deployment of an air bag for driver protection. Cok et al., U.S. Pat. No. 4,903,986 and Miller et al., U.S. Pat. No. 5,013,064 provide such a system comprising a container and cover which permit initial deployment of the cushion along alternate paths parallel to the driver should the cushion be prevented from deployment along its normal intended path toward the driver.

SUMMARY OF THE INVENTION

An object of this invention is to shield the air bag module during shipment and storage.

Another object of this invention is to prevent extraneous material from falling into the air bag module canister during shipment and storage of the module.

Another object of this invention is to provide a means to guide a passenger side air bag during deployment through tear seams of the dashboard.

Another object of this invention is to guide a passenger side air bag located a distance behind a dashboard over the gap between the edge of the containment canister and the inside surface of the dashboard.

Another object of this invention is to prevent a passenger side air bag located a distance behind a dashboard from inflating and expanding behind the dashboard Another object of this invention is to protect the deploying air bag from being punctured or torn by sharp edges formed by the ruptured tear seams of the dashboard.

Another object of this invention is to protect the deploying air bag from being punctured or torn by sharp edges of structural supports located behind the dashboard.

These and other objectives of the invention, which will become apparent from the following description, have been achieved by a novel cover and guide means for passenger side air bags for use during shipping, storage, and deployment thereof. The passenger side air bag is guided during deployment by a fabric chute or tubelike structure (hereinafter referred to as "chute") whose shape conforms to the shape of the canister opening to which it is attached or to the snout of the air bag adjacent the inlet opening for a gas produced by the inflator. During shipping and when stored behind the dashboard of a vehicle the upper portions of the side walls of the chute are folded inwardly over the opening of the module canister so as to partially cover the air bag and the upper portions of the front and back walls of the chute are then folded inwardly to cover the side walls. The top edges of the front and back walls may be joined by a rupturable fastener means to secure the cover formed by the inwardly folded walls. The cover formed by the inwardly folded chute walls protects and shields the air bag module from foreign matter which may fall onto the module during shipment and storage.

During deployment the air bag expands. The optional rupturable fastener means holding the top portions of the front and back walls together breaks away under the force of the expanding air bag and the upper portions of the chute walls return to their unfolded condition thus reforming the chute. The chute is sufficiently long to bridge the gap between the canister opening and the inside of the dashboard and to extend slightly beyond the dashboard. The fabric from which the chute is made and any seams holding the chute together are sufficiently strong so as not to rip or fail under the forces of the deploying air bag. The fabric chute guides the deploying air bag to the inside of the dashboard. As pressure builds, the air bag causes the rupturable seam of the dashboard to fail and the air bag deploys through the dashboard toward the vehicle occupants. The walls of the chute cover may pass through the opening in the dashboard thus protecting the air bag from sharp edges near the opening.

BRIEF DESCRIPTION OF THE DRAWINGS

With this description of the invention, a detailed description follows with reference being made to the accompanying FIGURES of drawing which form part of the specification, in which like parts are designated by the same reference numbers, and of which:

FIG. 1 is a perspective schematic illustration of the external profile of the guide chute illustrating the guide chute in a deployed condition;

FIG. 1a is a cross-sectional view taken along line 1a—1a of FIG. 1 illustrating stiffening means inserted between the double layers of the flexible side walls;

DETAILED DESCRIPTION OF THE INVENTION

Figure 2:
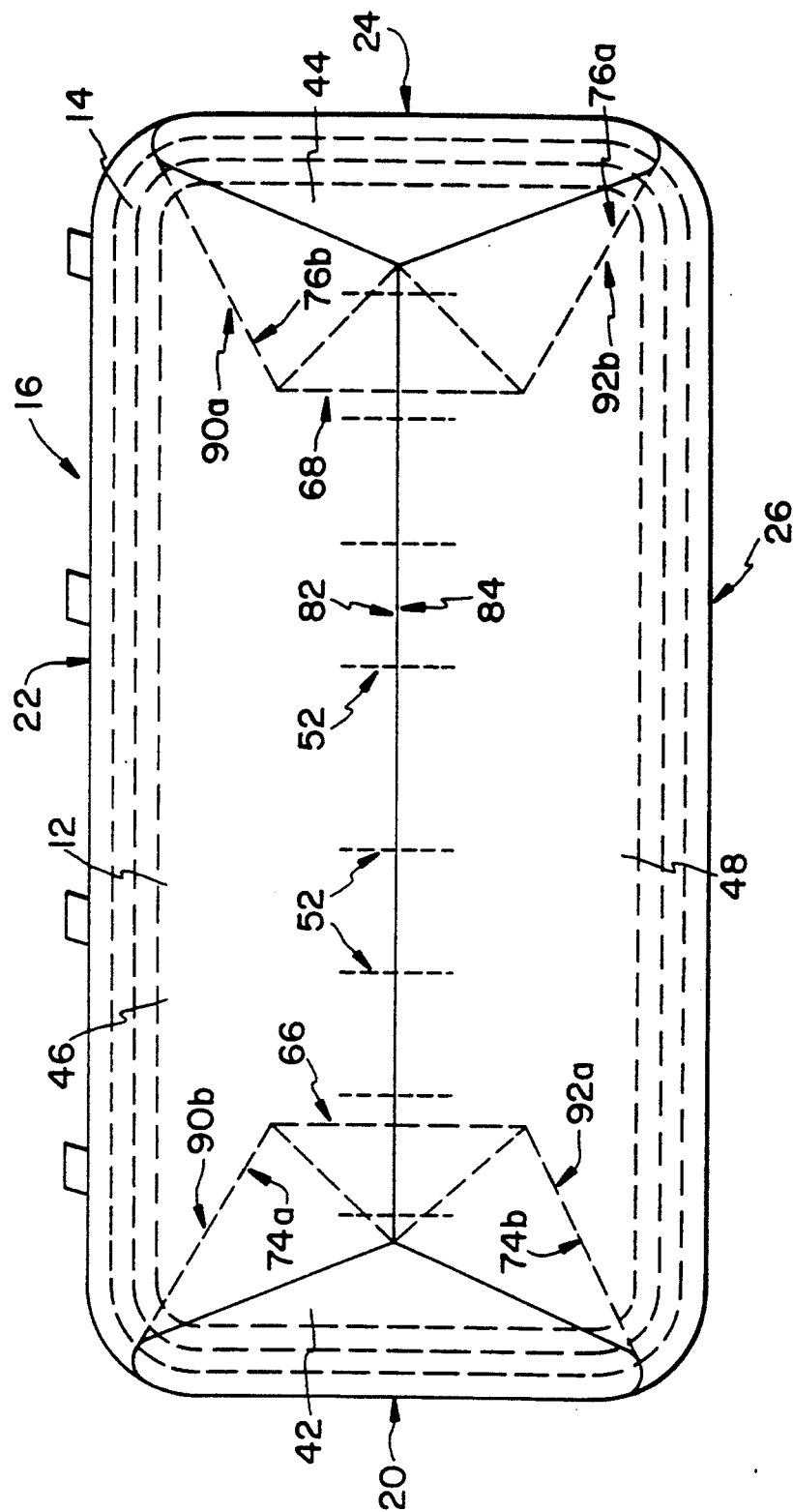
FIG. 2 is a top plan view of the air bag cover and canister illustrating the guide chute in a folded condition.
Figure 2A:
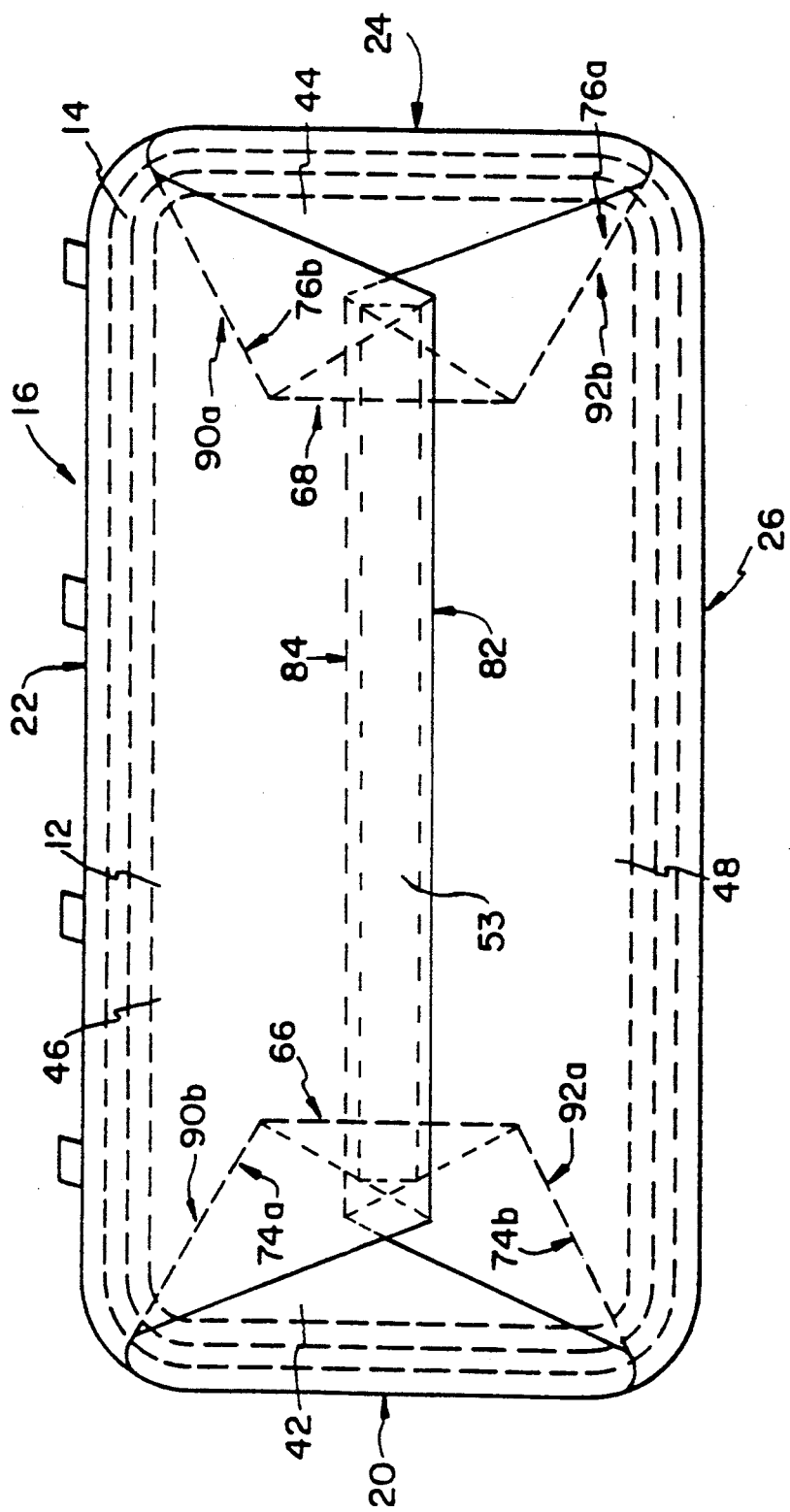
FIG. 2a is a top plan view of the air bag cover and canister illustrating the placement of a hood and loop type fastener used as a rupturable fastener means to hold the top edges of the second pair of side walls together.
Figure 4:
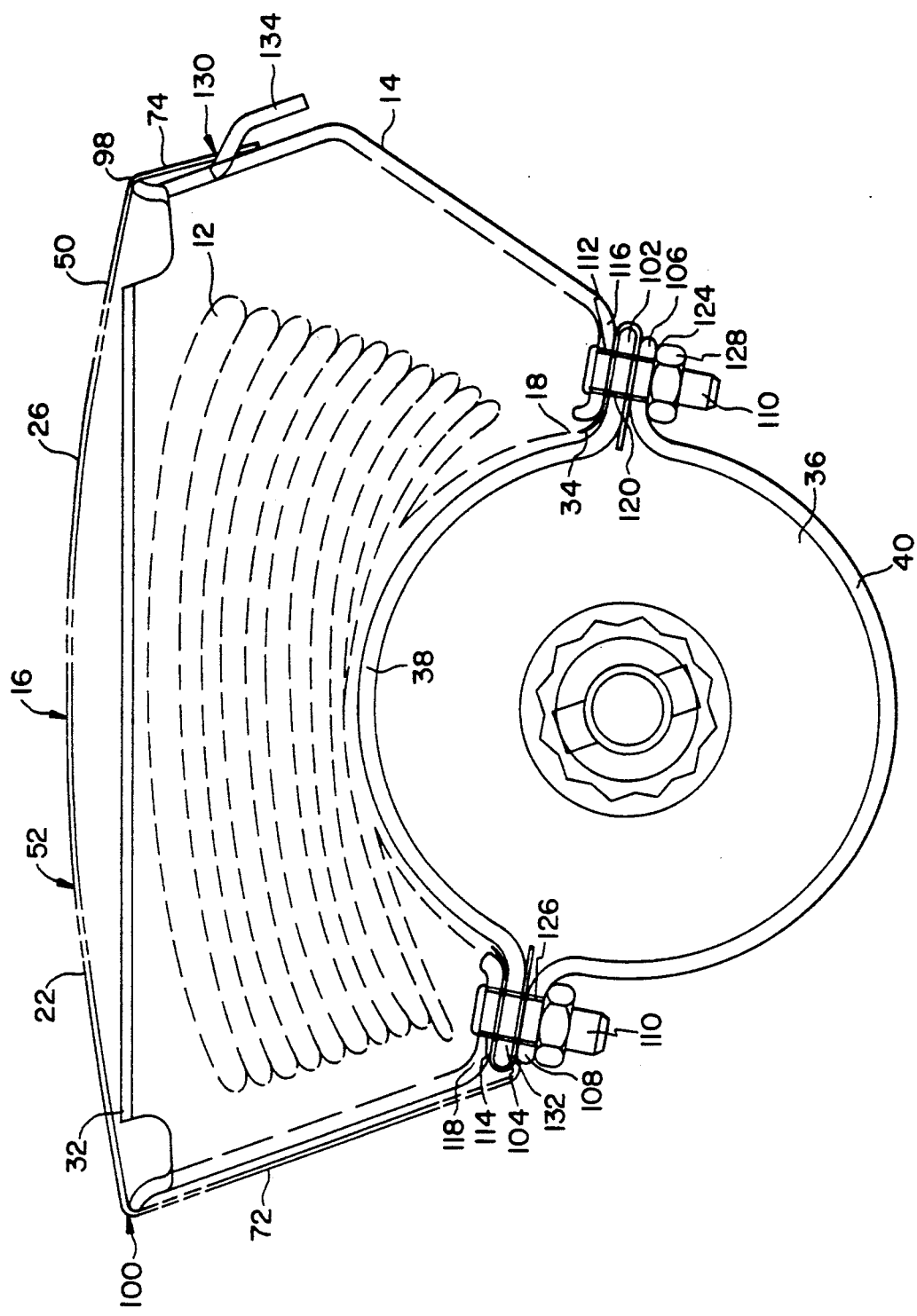
FIG. 4 is a end view of the air bag cover and canister illustrating the guide chute in a folded condition.

As best seen in FIG. 1, a guide device shown generally at 10 is provided for directing the deployment of an air bag cushion 12 from a module canister 14. The module canister 14 includes a chute 16 that is attached thereto at the opening thereof or alternatively to the air bag cushion 12 near an inlet opening 18 (as shown in FIG. 4) that is provided for receiving a gas for inflation of the air bag cushion 12. The chute 16 comprises a first pair of flexible spaced side walls 20 and 24 (respectively left and right walls when viewed from above) and second pair of flexible spaced side walls 22 and 26 (respectfully top and bottom when viewed from above). The canister 14 includes a pair of third walls 28 and a pair of fourth walls 30 that define respectively a top opening 32 (as shown in FIG. 4) and a bottom opening 34 as shown in FIG. 4. An air bag inflator 36 is held between a diffuser 38 and a cap 40 attached to the bottom 34 of the canister 14. Adjacent the inflator 36 and attached thereto is an air bag cushion 12. The chute 16 is attached to the canister 14 or the air bag cushion 12 as noted above and the top portions 42 and 44 of the first pair of flexible spaced side walls 20 and 24 respectively and the top portions 46 and 48 of the second pair of flexible side walls 22 and 26 respectively, are bent inward toward each other to form a top panel 50 (as shown in FIG. 4). The top portions 46 and 48 of the second pair of flexible side walls 22 and 26 can be joined by optional rupturable fastener means 52 as shown in FIG. 2 or by an optional rupturable fastener means 53 as shown in FIG 2a. Optional stiffening means 54, and 56 can be attached to the top portions of the first pair of flexibly spaced side walls 42 and 44 respectively, and stiffening means 58, and 60 can be attached to the top portions of the second pair of side walls 46, and 48 respectively. When the air bag cushion 12 is deployed the expanding air bag cushion 12 pushes on the top panel 50 of the folded chute 16 breaking the optional rupturable fastener means 52 thereby allowing the first pair of side walls 20 and 24 and second pairs of side walls 22 and 26 to return to their unfolded condition thereby reforming the chute which guides and directs the deploying air bag cushion 12.

Figure 3:
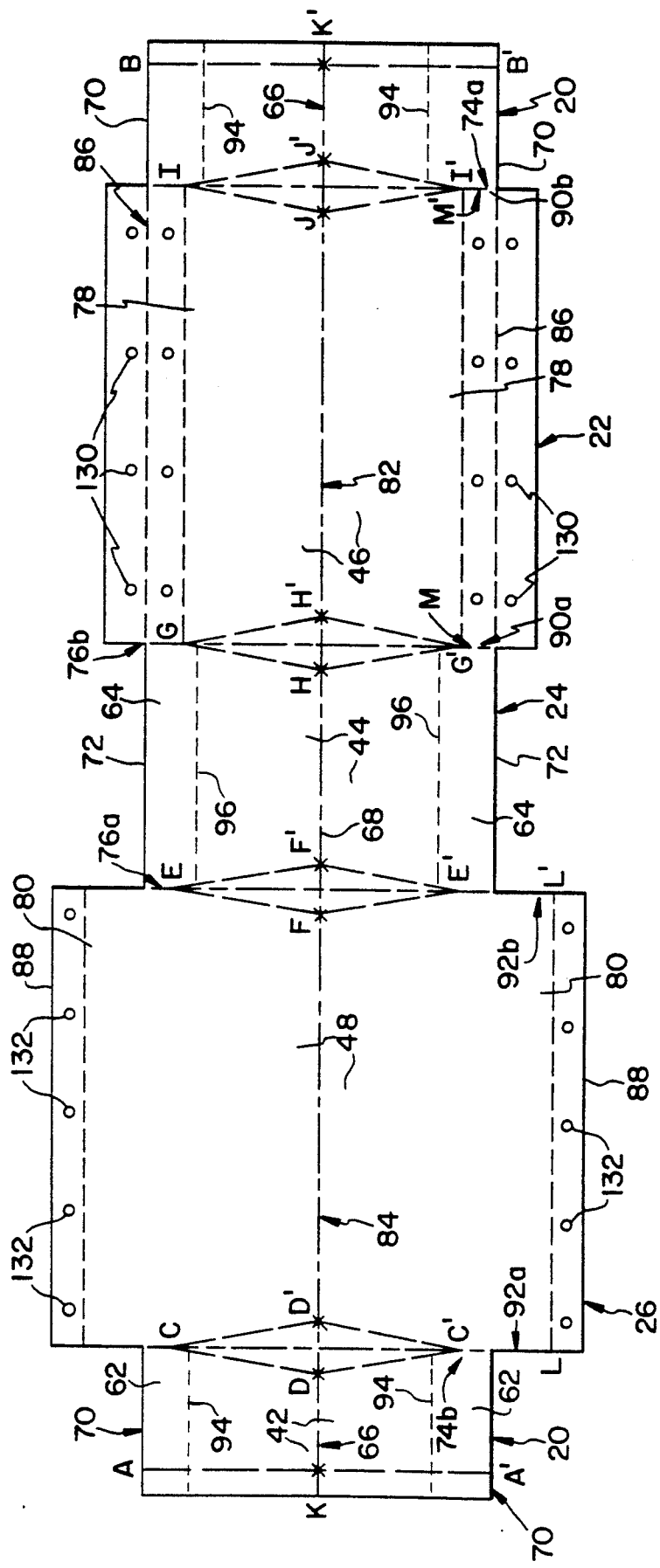
FIG. 3 is a front plan view of the pattern of the chute illustrating the position of the stitches and folds.

As shown in FIG. 2 & 3 the first pair of side walls 20 and 24 have top portions 42 and 44 respectively; and bottom portions 62 (as shown in FIG. 3) and 64 respectively; top edges 66 and 68 respectively; bottom edges 70 (as shown in FIG. 3) and 72 respectively; and left and right edges 74a and 74b, and 76a and 76b (when viewed from the outside of the chute) respectively. The second pair of side walls 22 and 26 have top portions 46 and 48 respectively; and bottom portions 78 (as shown in FIG. 3) and 80 respectively; top edges 82 and 84 respectively; bottom edges 86 (as shown in FIG. 3) and 88 respectively; and left and right edges 90a and 90b (as shown in FIG. 3), and 92a and 92b (when viewed from the outside of the chute) respectively.

The chute 16 can be made from any suitable flexible material having sufficient strength so as not to fail under the forces of an expanding air bag. The material used in the manufacture of the chute should stretch less than 5.0% and preferably less than 2.5% under the force of a deploying air bag. Material used in the manufacture of the air bag can be used in the manufacture of the chute. Materials suitable for use in this invention are woven fabrics made from nylon, polyester, and polyamide fibers. Knit fabrics should not be used as they stretch more than is permitted for the chute to function as described herein. Thin polymer films such as polyester, polypropylene, and the like can be used. These thin film polymers should be reinforced with one or more of the before-mentioned fibers. Natural fibers or fibers subject to structural degradation by molds or bacteria should not be used. Further, materials not approved for use in vehicle interiors should not be used.

Hinge means 94 (as shown in FIG. 3) and 96 are located intermediate the top portions 42 and 44 of the first pair of side walls and the bottom portions 62 (as shown in FIG. 3) and 64 respectively, and hinge means 98 and 100 (as shown in FIG. 4) are located intermediate the top portions 46 (as shown in FIG. 3) and 48 of the second pair of side walls and the bottom portion 78 and 80 respectively. The hinge means can be any suitable hinge means for connecting two pieces of flexible material providing the necessary flexing properties while maintaining the structural integrity of the chute. The hinge means can be a separate piece of woven material attached to the top and bottom portions of the side wall by sewing the hinge means to the top and bottom portions of the side walls or by attaching the hinge means with adhesive. Preferably the inherent flexibility of the fabric is to be relied upon to act as a hinge, thus reducing manufacturing time and cost.

To improve the structural integrity of the top portions of the side walls (as shown in FIG. 1) optional stiffening means 54 and 56 can be attached to the top portions of the first pair of flexible side walls 42, 44, and optional stiffening means 58, and 60 can be attached to the top portions of the second pair of flexible side walls 46, and 48. The optional stiffening means 54, 56, 58, and 60 increases the strength of the side walls opposing the forces applied perpendicular to the plane of the side wall by the expanding air bag 12 thus further enhancing the guide function of the chute 16.

The stiffening means can be made from any lightweight material suitable for providing structural integrity to the flexible side walls of the chute 16. Materials suitable for use as stiffening means include thin polymers sheets, woven fabric, and woven screen. Preferably the stiffening means is a stiff fabric which can be easily sewn through, or most preferred is woven screen or mesh which can be made stiffer while at the same time can be easily sewn through. The diameter of the thread from which the woven screening is made should be between 200 and 600 microns, with thread diameter of between 400 and 600 microns being preferred, with a thread diameter of 500 microns being most preferred. Woven fabric or mesh can be made from fibers of nylon 6/6, nylon 6, nylon 12, polypropylene, polyester, polyethylene, chlorotrifluoroethylene (ECTFE), tetrafluoroethylene (ETFE) or the like. Woven mesh of this type is sold by Tetko, Inc., Precision Woven Screening Media of Briarcliff Manor, New York. The stiffening means can be attached to the top portions of the flexible side walls by adhesives or preferably by sewing the stiffening means to the flexible side walls. Most preferred is to form the flexible side walls from a double layer of fabric and insert the stiffening means between the two layers of fabric and securing the stiffening means by sewing.

Figure 3A:
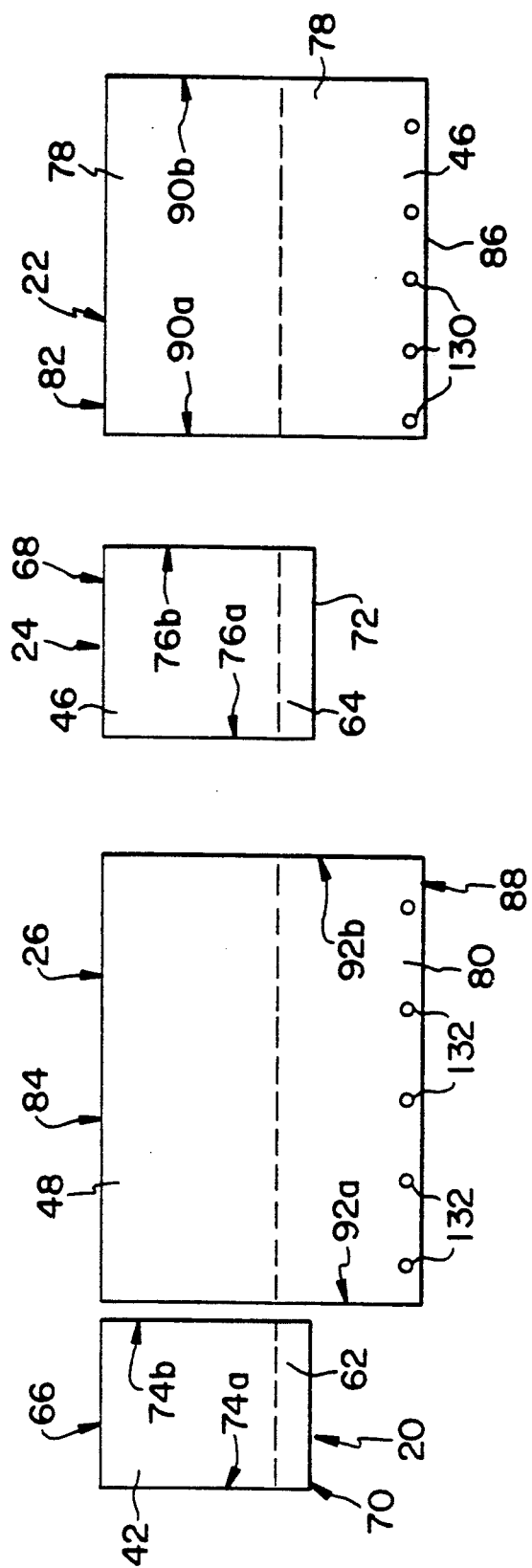
FIG. 3a is a front plan view of the sectioned chute.

As best seen in FIG. 3a, the chute 16 can be made by stitching first side wall 20 to second side wall 22 along side edges 74a and 90b respectively. Then the second side wall 22 is stitched to the remaining first side wall 24 along side edges 90a and 76b respectively. Next, the first side wall 24 is stitched to second side wall 26 along side edges 76a and 92b respectively. Finally, the second side wall 26 is stitched to the first side wall 20 along side edges 92a and 74b respectively. The thread used to stitch the side walls together can be any suitable thread such as nylon or polyester. The top edges 66, 82, 68, and 84 of the side walls 20, 22, 24, and 26 respectively, can be made shorter than the corresponding bottom edges 70, 86, 72, and 88. The resulting trapezoid forms inverted funnel which helps to guide the deploying air bag 16 and assure that the air bag 16 will fit through the opening formed in the dashboard.

Further, the side walls from which the chute is made do not have to be of the same length. The length of the side walls is determined by the module canister 14 and the fastening requirements. For example, one of the first pair of side walls can be joined to at least one of the second pair of side walls along side edges thereof such that the first pair of side walls are joined along the side edges from said top to the bottom edges to the second first pair of walls along the corresponding side edge from the top edge to a point intermediate between the top and bottom edges.

A more preferred method for manufacture of the chute is best seen in FIG. 3, the flat pattern for the folding and stitching of the chute 16. The FIG. 3 illustrates a flat pattern for manufacturing a double-layered chute made from a single piece of flexible material. Lines A—A' and lines B—B' are brought together and the material is sewn together along lines AB—A'B'. Optionally, the top edges 66, 68, 82, and 84 of sides 20, 24, 22, 26 can be made shorter than the respective bottom edges 70, 72, 86, and 88 by stitching darts into the material. The fabric is folded along lines C—C' such that points D and D' are brought together and the fabric is stitched along the lines C—DD' and C'DD'. This procedure is repeated for lines E—E', G—G', and I—I'. The resulting trapezoidal shaped side walls are believed to compensate for the inherent stretching of the material from which the chute is made, thereby assuring that the top opening of the chute will pass through the opening formed in the dashboard. Further the narrowed top opening of the chute compensates for the normal deformation or ovaling of the top opening of the chute due to the expanding air bag. The second side wall 22 is folded along the bottom edge 86. Finally, the flexible material is folded along lines K—K' so that bottom edges of the side walls coincide. Second side walls 22 and 6 are stitched together along lines L—L' and M—M' respectively.

Figure 8:
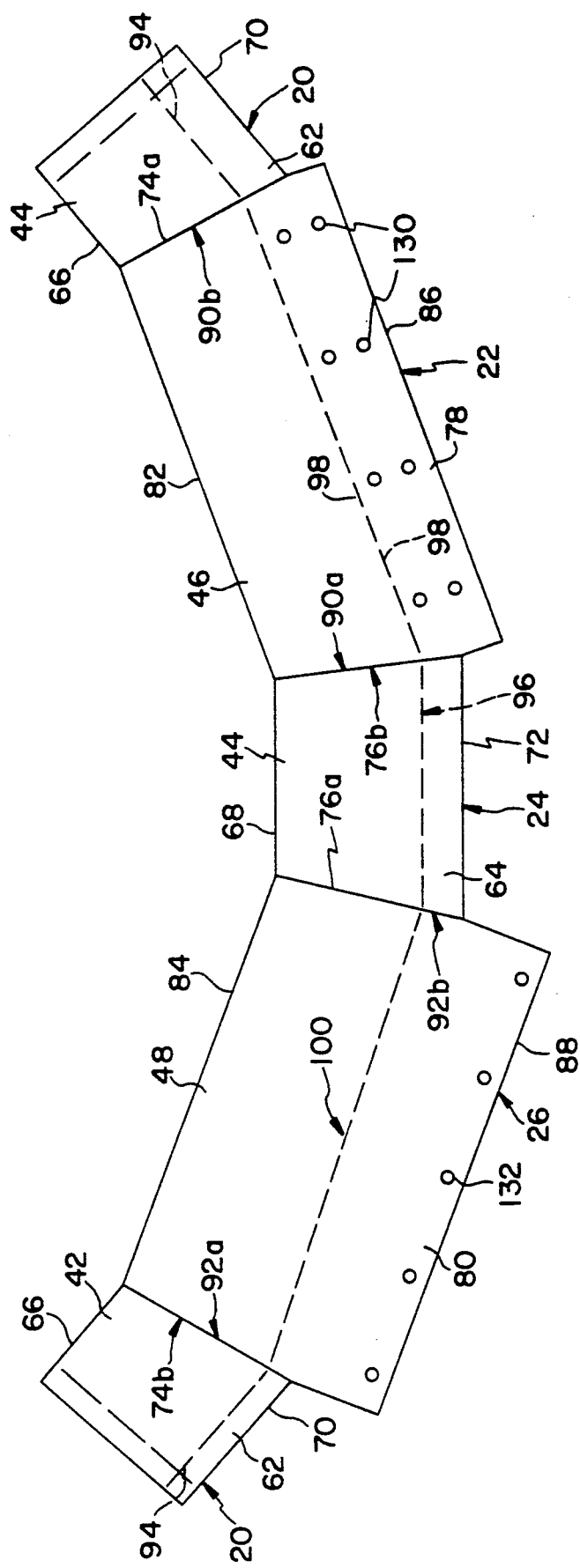
FIG. 8 is a fragmented side plan view of the air bag chute illustrating the tapered side walls of the chute.
Figure 10A:
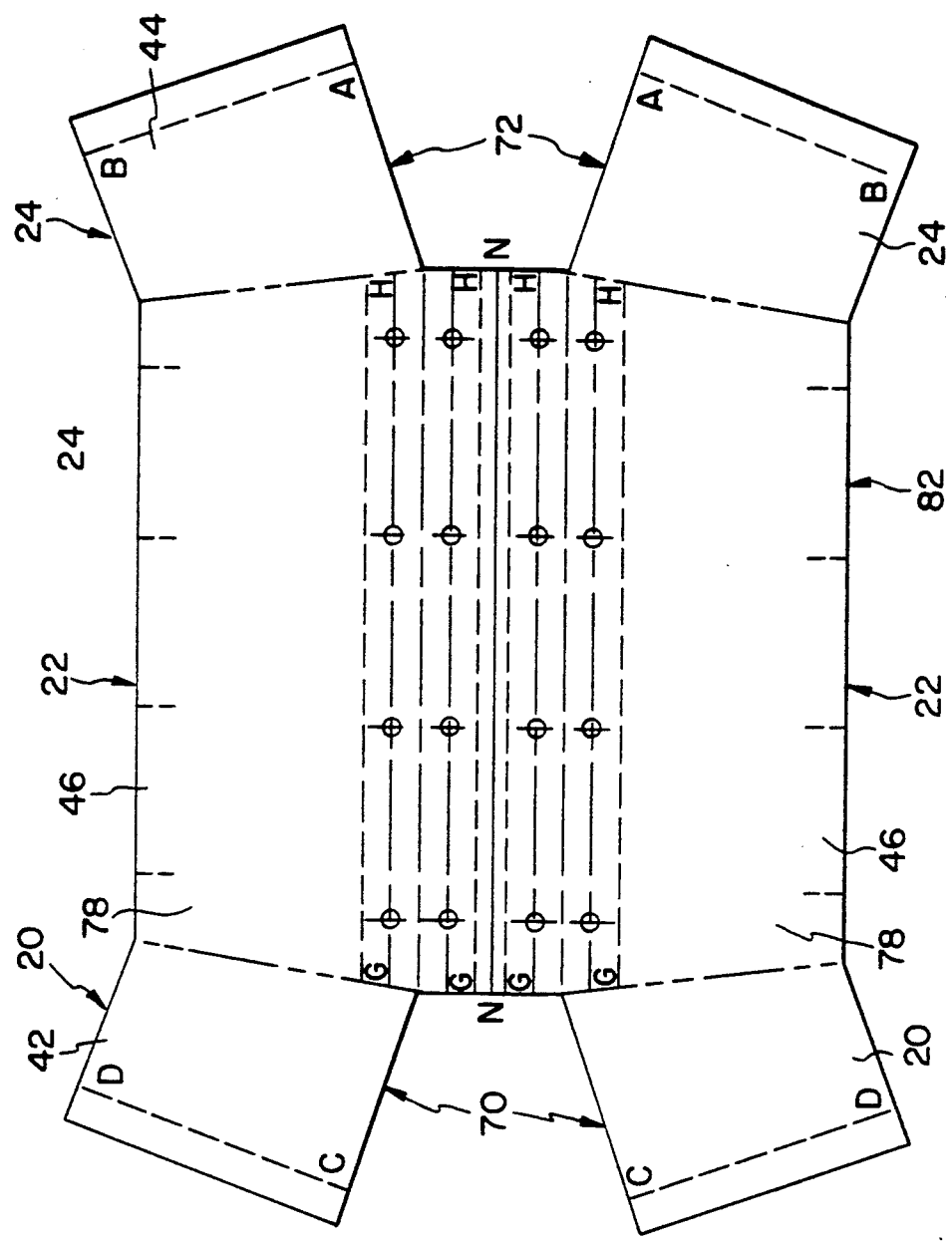
Figure 10B:
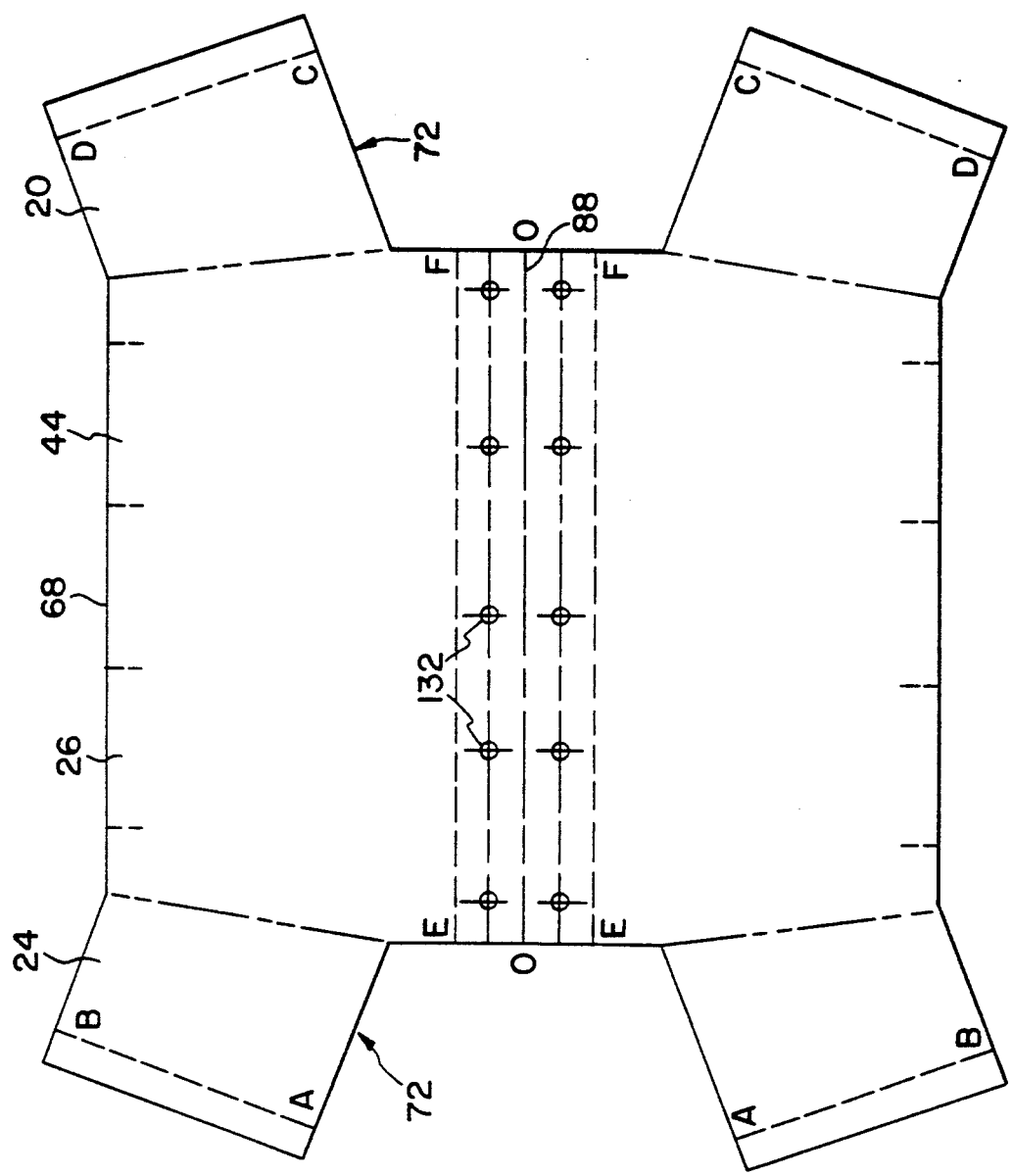

The most preferred method for manufacture of the chute is best seen in FIG. 10a and 10b, the flat pattern for the folding and stitching of the chute 16. The FIG. 10a and FIG. 10b illustrates a flat pattern for manufacturing a double layered chute made from a single piece of flexible material. The material of FIG. 10a is folded along lines N—N such that lines A—B and C—D are brought together. The material of FIG. 10b is folded along lines O—O such that lines A—B and C—D are brought together. Pairs of lines A-B of FIG. 10a and 10b are overlapped and stitched together and pairs of lines C-D of FIG. 10a and 10b are overlapped and stitched together. The resulting trapezoidal shaped is thus formed without the need to stich darts as in the method shown in FIG. 8. Lines G-H and E-F are then folded such that holes 130 and 132 are aligned and the material is stitched together.

The inflator 36 can be any of a number of known constructions, including the construction illustrated in U.S. Pat. No. 4,296,084 to Schneiter, which patent is assigned to the assignee of the present invention. The inflator 36 is clamped between a diffuser 38 with flanges 102 and 104 and a cap 40 with flanges 106 and 108. Fasteners 110 pass through fastener holes 112 and 114 in flanges 116 and 118 respectively (top and bottom of the canister when viewed from above), fastener holes 120 and 122 in diffuser flanges 102 and 104 respectively, and holes 124 and 126 in the cap flanges 106 and 108 and are secured with nuts 128 or the like. The chute 16 is secured by passing fasteners 110 through chute fastener holes 130 and 132 adjacent the bottom edges 86 and 88 of the second side walls 22 and 26 of the chute 16.

The preferred method for attaching the chute to the canister 14 as shown in FIG. 4 the air bag 12 is clamped adjacent the gas inlet opening 18 between canister flanges 116 and 118 and diffuser flanges 102 and 104 respectively. The fabrication and folding of the air bag 12 may be conventional, as known in the art. The bottom edge 88 of second wall 26 is clamped between diffuser flange 104 and cap flange 108. The chute 16 is drawn over the canister opening 32 and is secured by passing canister tabs 134 through fastener hole 130 in the bottom edge 76 of the other second side wall 26. The tabs 134 are then bent inward to secure the chute. This is the preferred method of attaching the chute since the module can be assembled with the chute attached on one side, the bag can then be folded and the chute secured with the tabs prior to shipping.

The lengths of the first pair of flexible side walls 20 and 24 and the second pair of flexible side walls 22 and 26 are determined by the shape of the canister. The first pair of side walls 20 and 24 are joined to at least one of the second pair of side walls 22 and 26 along side edges 90a, 90b, 92a, and 92b respectively thereof such that the first pair of side walls 20 and 24 are joined along the side edges 74a, 74b, 76a, and 76b respectively, from the top edge 66 and 68 to the bottom edges 70 and 72 to the second pair of walls 22 and 26 along the corresponding side edge from the top edges 82 and 84 to a point intermediate between the top and bottom edges. In this instance, the first side walls 20 and 24 and the top second side wall 22 are shorter than the bottom second side wall 26.

Figure 9:
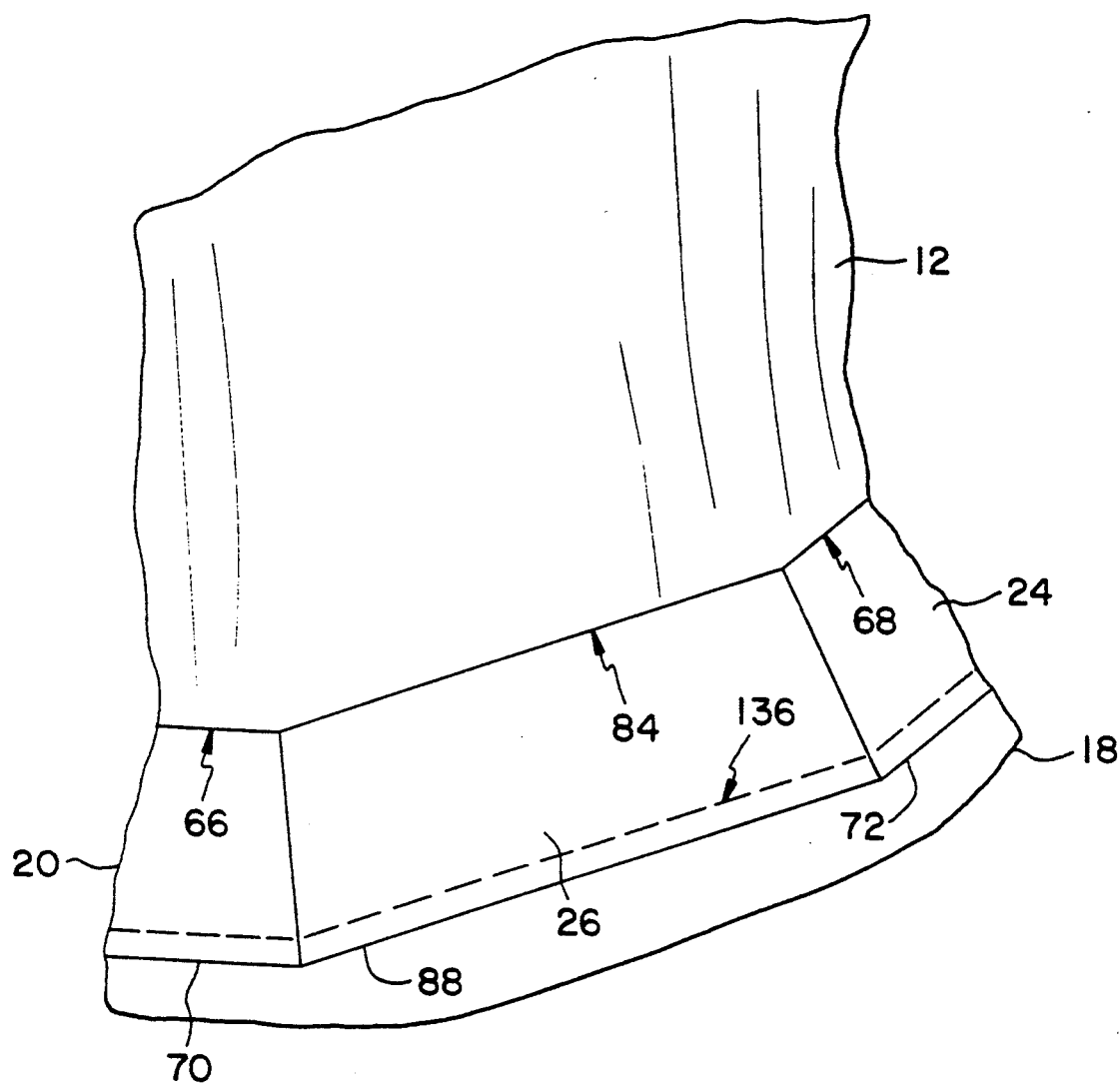
FIG. 9 is a fragmented front plan view illustrating the chute attached to the air bag adjacent the inlet for gas to inflate the air bag; an FIGS. 10a and 10b are a front plan view of the pattern of the chute illustrating the position of the stitches and folds.

The chute 16 can also be attached to the air bag cushion 12, along stitches 136, as seen in FIG. 9. The air bag is then attached to the canister 14 as stated above. Also, the chute 16 can be attached to the inside of the canister 14 using a mounting arrangement similar to that given above. The preferred method known to the inventors is to attach the chute to the outside of the canister using a combination of secured fasteners and tabs. Attaching the chute to the outside of the canister provides for maximum utilization of the canister interior for the air bag.

The chute can be sealed after manufacture by an optional rupturable fastener means 52 joining the top edges 82 and 84 of the second walls 22 and 26. The rupturable fastener means 52 can be a stitch a series of stitches perpendicular to the top edges as shown in FIG. 2, or a hook and loop type fastener 53 such as a Velcro ® hook and loop fastener as shown in FIG. 2a. Stitches perpendicular to the top edges are the preferred rupturable fastener as they do not add any thickness to the chute. The stitches should be made perpendicular to the top edges 82 and 84 and spaced some distance apart so that the stitches will fail simultaneously. The rupturable fastener should not be in the form of a stitch running the length of the junction of top edges 82 and 84 as the stitch may fail gradually from one side of the bag to another thus resulting in the deployment of the air bag 12 through a partially ruptured rupturable seam.

Figure 5:
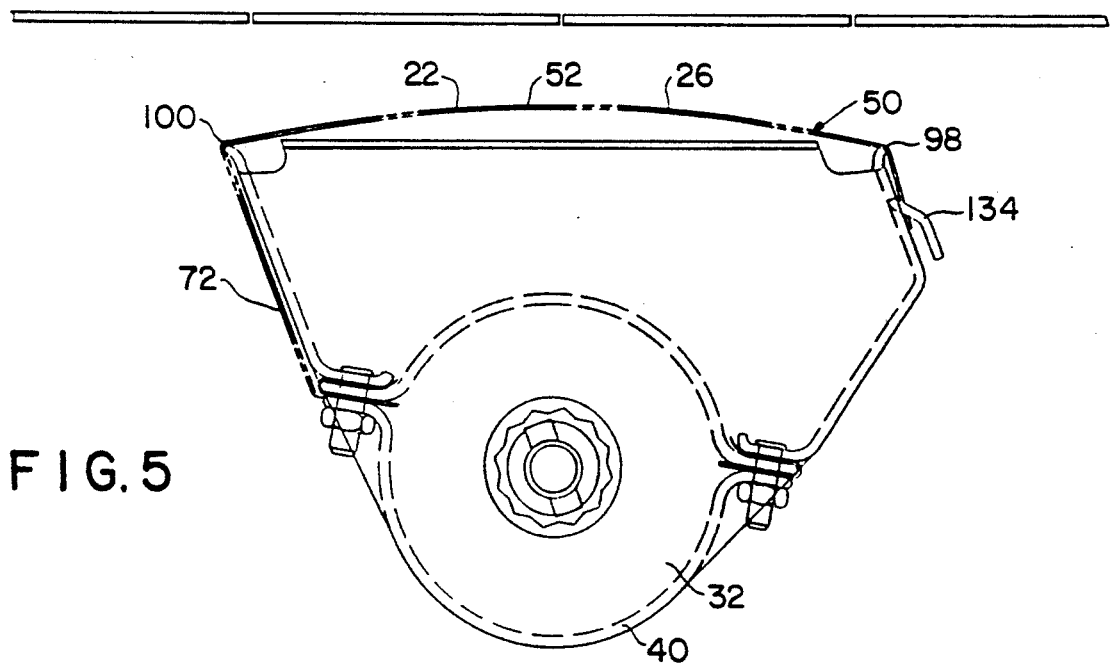
FIG. 5 is a end view of the air bag chute and module canister in position behind a vehicle dashboard illustrating the cover in a stored condition.
Figure 6:
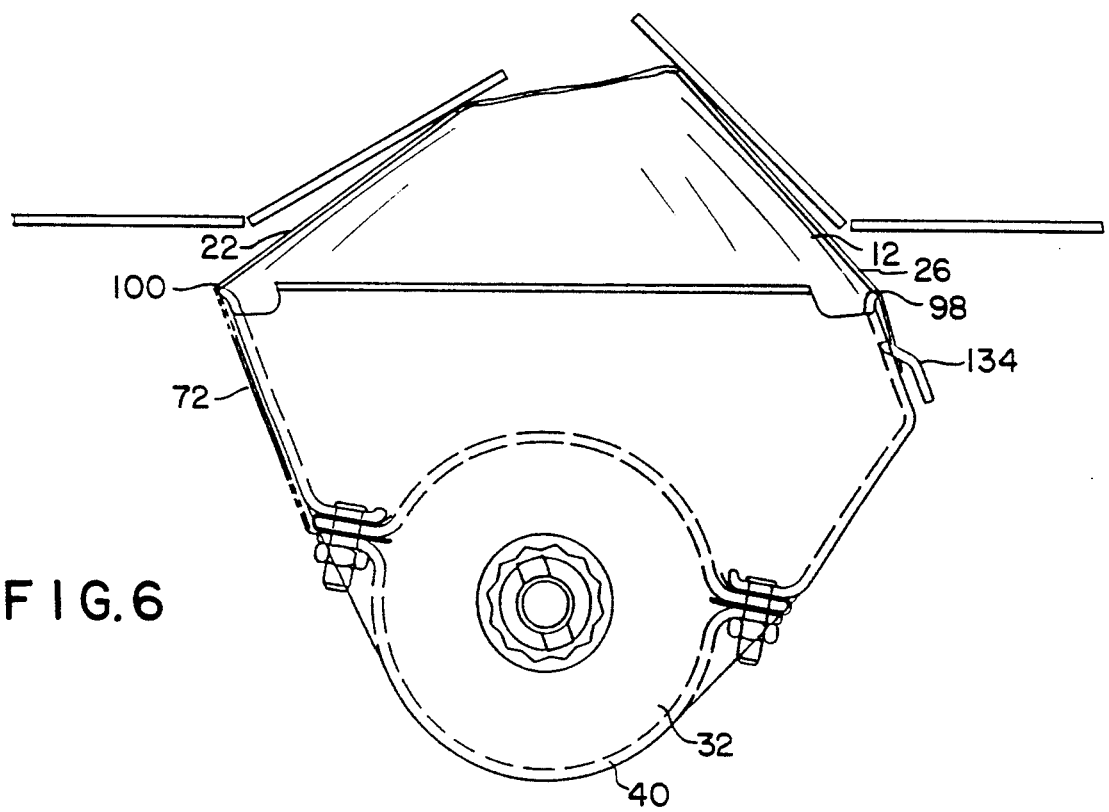
FIG. 6 is a end view of the air bag chute and module canister in position behind a vehicle dashboard illustrating the chute during deployment of the air bag.
Figure 7:
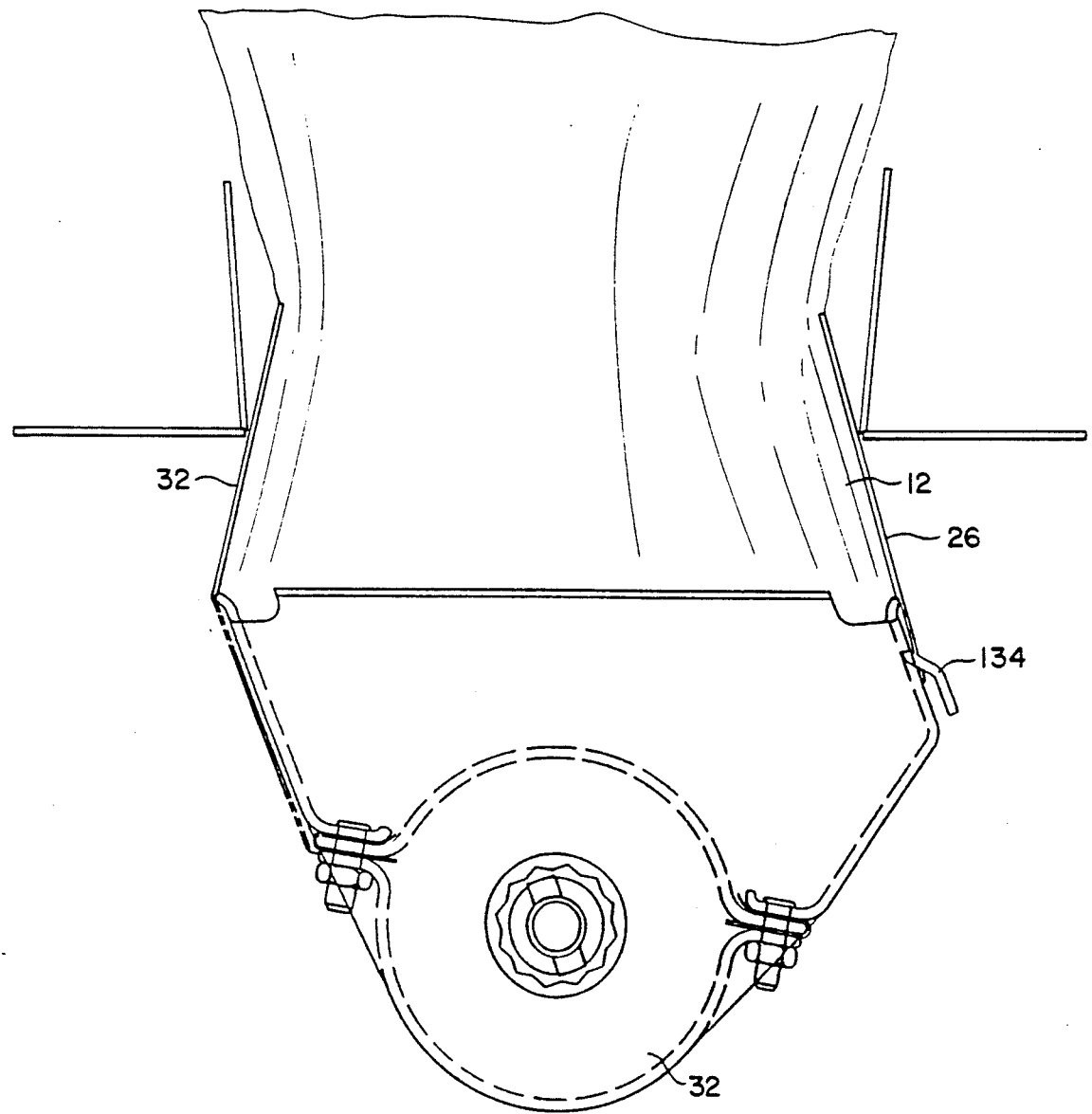
FIG. 7 is a end view of the air bag chute and module canister in position behind a vehicle dashboard illustrating the chute fully deployed.

As best shown in FIG. 4, the chute covers the canister opening preventing stray material from falling into the canister after manufacture, during shipping, and while stored behind the dashboard of the passenger compartment of a vehicle. As best shown in FIG. 5, the air bag module is behind the dashboard prior to deployment. A signal from a crash sensor (not shown) triggers the generation of gas by the inflator. The gas flows into the air bag from the inflator through the air bag gas inlet. The expanding air bag ruptures the optional rupturable fastener of the chute thus permitting the chute second walls to return to their unfolded condition. The air bag expands toward the dashboard returning the walls of the chute to their unfolded condition and breaking the rupturable seam of the dashboard. The air bag is prevented from expanding behind the dashboard during deployment by the presence of the chute, as shown in FIG. 6. The air bag continues to deploy through the dashboard toward the occupant. The air bag is protected from rupture by sharp edges around the opening by the chute, as shown in FIG. 7. Further, it is believed that, as the air bag expands, the chute is pushed back toward the opening in the dashboard as the chute completes its objective.

Thus, in accordance with the invention, there has been provided a means of cover and protecting an air bag after manufacture of the air bag module. There has also been provided a means to guide an air bag through the dashboard of a passenger vehicle during deployment. Additionally, there has been provided a means to prevent the improper deployment of an air bag behind a vehicle dashboard.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A device for guiding the deployment of a passenger side automotive safety cushion comprising:
    first and second pairs of flexible spaced side walls defining a chute in an unfolded condition, said chute having top and bottom openings, first and second pairs of side walls having a top edge, a bottom edge, side edges, a top portion, a bottom portion, and a hinge means between said top and bottom portion, said second pair of side walls are joined to said first pair of side walls along side edges thereof, wherein said top portions of said first pair of side walls are folded inwardly toward each other at said hinge means and said top portions of said second pair of side walls are folded inwardly toward each other at said hinge means covering said inwardly folded top portions of said first side walls, thereby forming a top panel having an infer side and an outer side;
    a folded inflatable occupant restraint cushion covered by said inner side of said chute top panel, said inflatable occupant restraint cushion having an inlet for a has for inflating and thereby deploying said cushion;

a vehicle air bag canister having an inside and an outside including a wall defining a cavity for a gas generator and at least part of a folded inflatable occupant restraint cushion, said wall further defiling an opening to said cavity in said canister, the gas generator being actuable to generate a gas under pressure in said cavity, said folded inflatable occupant restraint cushion within said cavity of said vehicle air bag canister; and wherein upon said gas generator being actuated to generate a gas under a pressure in said cavity thereby expanding said cushion which engages said top panel of said chute whereupon said inwardly folded top portions of said first walls and said inwardly folded top portions of said second walls are returned to their unfolded condition thus reforming said chute thereby guiding the deployment of said cushion.

2. A device as specified in claim 1 wherein said first pair of side walls are joined to at least one of said second pair of side walls along side edges thereof such that said first pair of side walls are joined along said side edges from said top to said bottom edges to said second pair of walls along said corresponding side edge from said top edge to a point intermediate between said top and bottom edges.

3. A device as specified in claim 2 wherein said flexible spaced side walls are made from fabric.

4. A device as specified in claim 3 wherein the flexible spaced side walls are made from fabric used in the construction of the air bag.

5. A device as specified in claim 3 wherein the material of said flexible spaced side walls are made from woven fabric selected from the group consisting of nylons, polyesters, and polyamides.

6. A device as specified in claim 2 wherein said bottom edge of said chute is attached adjacent said inlet of said inflatable occupant restraint cushion.

7. A device as specified in claim 2 wherein said top edges of said second side wall are shorter than said bottom edge of said corresponding second side wall.

8. A device as specified in claim 2 wherein said top portion and said bottom portion of said side walls and said hinge means comprise one continuous piece of fabric.

9. A device as specified in claim 1 wherein said top edges of said second walls are joined to each other by rupturable fastener means.

10. A device of claim 9 wherein said rupturable fastener means is a hook and loop type fastener.

11. A device of claim 9 wherein said rupturable fastener means is a rupturable stitch.

12. A device as specified in claim 1 wherein said top edges of said first side wall are shorter than said bottom edge of said corresponding first side wall.

13. A device as specified in claim 1 wherein said top portions of said side walls are reinforced by a stiffening means.

14. A device as specified in claim 13 wherein said stiffening material is a polymer selected from the group consisting of nylon, polypropylene, polyester, polyethylene, chlorotrifluoroethylene, and tetrafluoroethylene.

15. A device as specified in claim 13 wherein said side walls are made from a double layer of fabric with stiffening means inserted between said fabric of said top portion.

16. A device as specified in claim 1 wherein said bottom edge of said bottom portion of said chute is attached to said outside of said canister.

* * * * *

UNITED STATES PATENT AND TRADEMARK OFFICE
CERTIFICATE OF CORRECTION

PATENT NO. : 5,242,192

DATED : September 7, 1993

INVENTOR(S) : Prescaro et al.

It is certified that error appears in the above-identified patent and that said Letters Patent is hereby corrected as shown below:

At column 9, line 2, "has" should be -- gas --.

At column 9, lines 7-8, "defiling" should be -- defining --.

Signed and Sealed this

Fifth Day of July, 1994

Attest:

BRUCE LEHMAN

Attesting Officer

Commissioner of Patents and Trademarks